(12) United States Patent
Kaliner

(10) Patent No.: US 8,571,537 B2
(45) Date of Patent: Oct. 29, 2013

(54) METHOD FOR OVER-THE-AIR PERSONALIZING OF CHIP CARDS IN TELECOMMUNICATIONS

(75) Inventor: Stefan Kaliner, Koenigswinter (DE)

(73) Assignee: Deutsche Telekom AG, Bonn (DE)

( * ) Notice: Subject to any disclaimer, the term of this patent is extended or adjusted under 35 U.S.C. 154(b) by 205 days.

(21) Appl. No.: 12/989,867

(22) PCT Filed: Apr. 17, 2009

(86) PCT No.: PCT/EP2009/002827
§ 371 (c)(1),
(2), (4) Date: Nov. 26, 2010

(87) PCT Pub. No.: WO2009/141035
PCT Pub. Date: Nov. 26, 2009

(65) Prior Publication Data
US 2011/0136482 A1     Jun. 9, 2011

(30) Foreign Application Priority Data
May 23, 2008  (DE) ......................... 10 2008 024 798

(51) Int. Cl.
*H04M 3/00* (2006.01)
*H04B 1/38* (2006.01)

(52) U.S. Cl.
USPC ............................ 455/419; 455/418; 455/558

(58) Field of Classification Search
USPC ........................... 455/410–411, 418–420, 558
See application file for complete search history.

(56) References Cited

U.S. PATENT DOCUMENTS 6,591,098 B1  7/2003  Shieh
7,266,371 B1  9/2007  Amin
2006/0183500 A1  8/2006  Choi
2007/0167161 A1  7/2007  Cheng
2009/0191916 A1 * 7/2009  Mardiks ........................ 455/558

FOREIGN PATENT DOCUMENTS

EP  1895791 A  3/2008

* cited by examiner

*Primary Examiner* — Wesley Kim
*Assistant Examiner* — Nam Huynh
(74) *Attorney, Agent, or Firm* — Andrew Wilford

(57) ABSTRACT

The invention relates to a method for commissioning and personalizing a subscriber identification module SIM, wherein the SIM is set up with a non-individual and preliminary set (S*) of initial identifying and authenticating parameters prior to first commissioning, said set comprising at least one non-individual and preliminary subscriber identification (IMSI*) and a non-individual and preliminary secret key (K*), wherein the parameter set (S*) allows first commissioning of the SIM in a mobile telecommunications network by means of a mobile terminal device, wherein personalizing is performed after the first commissioning of the SIM, in that an individual and final subscriber data set (S) is transferred to and stored on the SIM, particularly comprising a unique final subscriber identification (IMSI) and a unique final secret key (K), particularly in that the final subscriber data set (S) is transferred by means of a regular connection of the mobile telecommunications system using the preliminary set (S*). The number of potential preliminary subscriber data sets is prescribed and is particularly much less than the total number of subscriber identification modules (SIM) equipped with said data sets. It can also be reused cyclically. The final subscriber data set is first stored after the mobile terminal device confirms that the personalization process was successful. Otherwise, the personalization request is automatically repeated, or the personalization data are sent again.

18 Claims, 2 Drawing Sheets

METHOD FOR OVER-THE-AIR PERSONALIZING OF CHIP CARDS IN TELECOMMUNICATIONS

CROSS REFERENCE TO RELATED APPLICATIONS

This application is the US-national stage of PCT application PCT/EP2009/003399, filed 13 May 2009, published 26 Nov. 2009 as 2009/141086, and claiming the priority of German patent application 102008024573.9 itself filed 21 May 2008.

FIELD OF THE INVENTION

The invention relates to a method of commissioning and personalizing a subscriber identification module (SIM).

BACKGROUND OF THE INVENTION

Chip cards are used in telecommunications, in particular for example in mobile GSM or UMTS systems, for the unique and secure identification of the subscribers as well as for providing various special functions and value-added services. To this end the chip cards or chip card applications (referred to together as "SIM" or synonymously as subscriber identification module) referred to for example as UICC, SIM, USIM, R-UIM or also as ISIM depending on the generation and type of the underlying system standard bear a plurality of special parameters, secret keys and further elements of various kinds for example relating to network operator, provider, product or subscriber.

To commission a mobile terminal device and subscribe to the mobile radio telephone service, a SIM with specific individual data—at least the international mobile subscriber identity (IMSI), secret key K and individual parameters for the authentication algorithm—is mandatory. Corresponding elements must be present in the subscriber databases, for example the home location register (HLR/AC or HSS) of the home network, otherwise it is not possible to set up a connection from the subscriber side or from the network side.

Loading the SIMs and the specification of the individual data are carried out within the scope of the card production during the so-called personalization, in any case long before the subscriber identification module SIM is used. The value chain of the card preparation is generally represented as follows:

Chip manufacturer: Manufactures the chip with (parts of) the operating software.

Card manufacturer: Manufactures the card body, implants the chip, optionally loads further, non-individual parts of the operating software and corresponding data.

Personalizer: Loads more individualized data, individual subscriber identifiers, secret keys and optionally further parts of the software (applications). Exchanges individual data with the network operator. Is usually identical to the card manufacturer.

Packager/logistician: Packages and ships the personalized chip cards to the network operator or other destinations. Can be identical to the card manufacturer and/or the personalizer.

Network operator: Operates the communications network. Defines the personalization for his products, supplies all specifications to the personalizer, obtains individual data (at least IMSI, K and individual parameters of the authentication algorithm) from the personalizer to establish the subscriber relationships in his databases.

At the end of the provision process the SIMs are in the retail outlets of the network operator. The assignment to the concrete customer and the assignment of a telephone number does not occur until the conclusion of a mobile radio agreement within the scope of the so-called activation. The activation requires that the subscriber relationship is stored in the databases of the network operator.

The following should be given as disadvantages of this process chain, in particular of centralized personalization:

Specialization and individualization of the product early in the preparation chain, the actual requirement can only be estimated at this time.

Tying up of resources (database and number capacity) for the network operator takes place in part long before the actual requirement.

Very special service with technically complex solutions and restricted flexibility. High expenditure for the support of the external personalizer. Changes are generally ordered after bid, then developed, tested and accepted, with corresponding time needed. Necessary flexibility requires complex interfaces.

Considerable difficulties in handling new SIM designs, such as non-removable or "machine-to-machine" (M2M) variants. Leads to unfavorable specialization as early as the primary products. Shackles innovation.

Alternative "soft" concepts for SIMs are completely impossible with conventional personalization.

OBJECT OF THE INVENTION

The object of the invention is therefore to further develop a method of commissioning and personalizing a SIM subscriber identification module which overcomes the disadvantages of the method according to the prior art and in particular makes it possible, without tying up resources, such as for example, the database and number capacity, at an early stage, for a provision that copes with the current demand of personalized SIM subscriber identification modules released for operation in a mobile telecommunications network to be possible at any time.

SUMMARY OF THE INVENTION

It is particularly advantageous in the method according to the invention for commissioning and personalizing a SIM subscriber identification module that the SIM is equipped with a non-individual and preliminary set (S*) of initial identification and authentication parameters before the first commissioning, containing at least one non-individual and preliminary subscriber identification (IMSI*) and a non-individual and preliminary secret key (K*), wherein the parameter set (S*) permits a first commissioning of the SIM in a mobile telecommunications network by means of a mobile radio terminal, wherein a personalization is carried out after the first commissioning of the SIM, in that an individual and final subscriber data set (S) is transmitted and stored on the SIM, in particular containing a unique final subscriber identification (IMSI) and a secret key (K), in particular that the final subscriber data set (S) is transmitted via a regular connection of the mobile telecommunications system using (S*).

The preliminary set (S*) of initial identification and authentication parameters thus contains at least one non-individual and preliminary subscriber identification (IMSI*) and a non-individual and preliminary secret key (K*), wherein the parameter set (S*) permits a first commissioning of the SIM in a mobile telecommunications network by means of a mobile radio terminal, i.e., that the subscriber identification as well as the secret key are non-individual and only preliminary as components of the preliminary set (S*) of initial identification and authentication parameters.

It is hereby possible firstly to equip a plurality of subscriber identification modules SIM (Subscriber Identity Module), which permit a use of the services of a mobile telecommunications network, with non-individual and preliminary parameter data sets, without the corresponding number of resources, such as for example, uniquely assigned subscriber identities (IMSI) and mobile subscriber integrated services digital network number (MSISDN) or mobile telephone numbers already having to be assigned, since the preliminary parameter data set permits a first commissioning, i.e., a logging into a mobile telecommunications network, and the personalization of the SIM is thus carried out on the network side in that a final subscriber data set is generated, transmitted via the existing radio connection or via a specially secured radio connection and stored on the SIM. The final subscriber data, which are stored on the SIM and are used for the subscriber identification in the use of services of the mobile telecommunications network, are thus transmitted to the SIM in the scope of a standard over the air (OTA) process. The existing resources and network capacities are also hereby used in an advantageous manner.

The present invention makes it possible to shift the personalization in terms of location from the external personalizer into the domain of the network operator and in terms of time to the end of the preparation chain to the ideal time of the first commissioning of the mobile terminal.

The suggested method makes it possible to produce subscriber identification modules (SIM) for a mobile communications system entirely without individual data (apart from for example a consecutive serial number) and to prepare them for delivery. At this time, they hold instead special non-individual and temporary identification data, which, however, nevertheless render possible a connection in line with standards to the network of the operator. The individual personalization of the final parameters of the subscriber relationship and the further dedicated equipment of the SIM with data and applications then takes place with OTA mechanisms. The design of the technology on the card further renders possible the unlimited repetition of the process (re-personalization, also within the scope of a change in network operator) and the possibility of changing all of the relevant data at any time in the same manner. The advantages are in detail:

- The individual configuration of the SIM takes place at the latest possible time, the greatest flexibility with respect to the use of the SIM is maintained until then.
- Since no individual personalization now takes place within the scope of the card production, this process can be omitted without replacement. The cited disadvantages of the prior art are avoided.
- The interface to the card manufacturer is simplified considerably, since no personalization parameters now need to be transmitted and no security-critical individual data need to be sent back.
- Within the scope of the card manufacture there is no arrangement in the databases of the network operator and thus no tying up of resources long before the actual need, either.
- Fundamentally, no storage of individual data is necessary, by the card manufacturer, network operator or a third party.
- Modern alternatives to the conventional SIM are rendered possible and are made additionally attractive: in the use of non-removable or "M2M" modules, it is additionally possible to save by omitting the role of the card manufacturer, since the chip manufacturer can ship directly. In the case of soft concepts, even the role of the chip manufacturer in the preparation chain can be omitted.
- The infrastructure that has to be provided by the network operator anyway for the targeted OTA customizing of the SIM after commissioning (when for example the terminal device and the rate for the customer have been established) additionally takes on the function of personalization and is used more effectively. Synergy effects are thus produced.

New types of SIM designs, which implicitly require or cause changes to the conventional role model anyway (such as variants that are mechanically inserted, soldered in or realized in software), can thus utilize their advantages better, the later they are individualized and specialized. These variants generally do not fall into the hands of users and are a fixed component of a terminal device long before the network operator is known. Furthermore, this can change during the life cycle of the terminal device. Thus within the scope of the discussion about future forms of SIM the question of the possibility of re-personalization frequently comes up. Moreover, it would be ideal to have an extensive independence from a network operator until the moment of commissioning in order to permit the simplest possible production, without complex interfaces, the administration of operator-specific number ranges, proprietary authentication algorithms, etc.

The present invention renders possible precisely these important features, wherein the initial home operator (or the operator group) is fixed at any time but does not further require the coordination of individual data. Nevertheless, the network operator still has the full range of possibilities of influence and design via the target personalization—which only he can carry out.

Chip cards according to the invention are preferably equipped with a non-individual set of initial identification and authentication parameters $$S^*_I = \{IMSI^*_I, K^*_I, OPc^*_I, Qc^*_I, OK^*_I\} \text{ with } I=0, 1 \ldots, N-1 \text{ and } N \ll M;$$

wherein $IMSI^*_I$ can contain the valid network identifier MCC and MNC of the operator. N designates the entire quantity of the $S^*_I$ and M designates the quantity of those SIM produced in total for a network operator. Within M the $S^*_I$ are thus repeated MIN times and are thus not unique and not individual.

As the sole individual feature for example, the usual chipcard (SIM) serial number (ICCID) can be added, which is assigned consecutively by the manufacturer during production. It is important that all of the data to be assigned by the manufacturer in the current production process are assigned fully automatically and without any special (individual) specifications of the network operator.

In particular, moreover, there is no storage or transfer of individual data by the SIM manufacturer, network operator or a third party.

In the operator's mobile telecommunications network there is a special database (THLR) of the firm size N with the $S^*_I$ and respectively a firmly assigned telephone number $MSISDN^*_I$. The subscriber relationships in this database are unchangeable, in particular there is no connection to the chip card manufacturer.

An associated SIM is now put into operation in a completely standard (i.e., not equipped with any special precautions with regard the method described here) mobile terminal device for the first time. After the first commissioning with $S^*_1$, the transmission of the final subscriber data (S) takes place, which are stored on the SIM subscriber identification module. At the same time, these final subscriber data are also stored in the HLR home register. The SIM subscriber identification module is then ready to operate with the final data.

Preferably, with the first commissioning a connection is set up to a personalization server (PS) inside the mobile telecommunications network, wherein the individual and final subscriber data set (S) for the personalization is generated on the part of the personalization server (PS) and transmitted to the SIM, in particular using the non-individual and preliminary subscriber data (S*I).

Preferably, the preliminary subscriber identification (IMSI*$_t$) is not unique and can be provisionally assigned to several subscriber identification modules (SIM). It is hereby possible to conserve the existing resources in that parameter sets are for example reused cyclically, wherein the SIM, however, can remain identifiable and distinguishable based on a unique identification, such as for example, the serial number.

In a preferred embodiment, before the personalization is carried out a review of the serial number of the SIM (ICCID) and/or of the mobile radio terminal is carried out based on the international mobile equipment identity (IMEI), by which the mobile radio terminal can be clearly identified, and/or a review of other security parameters of the SIM. The security of the method can hereby be increased.

Preferably, the number of the possible non-individual and preliminary subscriber data sets (S*), containing at least one non-individual and preliminary subscriber identification (IMSI*) and a non-individual and preliminary secret key (K*), is fixed and in particular is much smaller than the number of the total of subscriber identification modules (SIM) equipped with these data sets (S*), wherein at any time there are many subscriber identification modules (SIM) with identical preliminary data (S*).

Particularly preferably, the non-individual and preliminary subscriber data sets (S*), containing at least one non-individual and preliminary subscriber identification (IMSI*) and a non-individual and preliminary secret key (K*), are cyclically reused during the initial equipment of the subscriber identification modules (SIM), in particular regardless of whether or how many of the SIM have already been personalized with individual and final subscriber data (S).

A uniform distribution of the preliminary, non-individual subscriber data sets (S*) can be ensured hereby, so that an accidental accumulation of one or more of these non-individual subscriber date sets (S*) does not occur. The risk of a collision by accidental simultaneous use of the same preliminary subscriber data set with two different SIM cards, i.e., subscriber identification modules, can hereby be reduced.

Preferably, after the receipt and storage of the final subscriber data set (S) on the SIM, the receipt of the subscriber data set (S) a confirmation is transmitted from the mobile radio terminal to the mobile telecommunications network. Preferably, a warm start of the mobile radio terminal using the new subscriber data set (S) is then carried out. Through the acknowledgment of the correct data reception, the mobile telecommunications network receives a return report of the completed personalization from the SIM so that the operation can be concluded.

Preferably, the final subscriber data set (S) generated during the personalization is stored in the home register (HLR). The storage of the subscriber data set (S) and of the associated subscriber data in the home register (HLR) permits the usage of the services of the mobile telecommunications network.

The subscriber relationship can thereby at first be provided with specific service restrictions which are not removed until later, after the establishment of the customer data, desired services, etc.

Preferably, during the first commissioning with the parameter set (S*) the subscriber relationship given by the (IMSI*) is set by the network side at an "in use" status, for the duration of which only a restricted use is released, in particular the implementation of the personalization, wherein after the personalization of the SIM with the individual and final subscriber data set (S) has been completed, the subscriber relationship given by the (IMSI*) is set at a "released" status, which permits the new use of the subscriber relationship given by the (IMSI*) by another SIM subscriber identification module.

Particularly preferably, with a commissioning attempt of one or more further SIM with an identical preliminary parameter set (S*) of a first SIM already logged into the mobile telecommunications network an ordering in a queue takes place and a processing according to the chronological order of the commissioning attempts.

Preferably, with a commissioning attempt of one or more further subscriber identification modules (SIM) with a preliminary subscriber identification (IMSI*) identical to a first subscriber identification module (SIM) already logged into the mobile telecommunications network for personalization, a possible blocking of the personalization operation (absence of the personalization data) is recognized by the subscriber identification module (SIM) and leads to the automatic repetition of the personalization request.

Preferably, with a commissioning attempt of one or more further subscriber identification modules (SIM) with a preliminary subscriber identification (IMSI*) identical to a first subscriber identification module (SIM) already logged into the mobile telecommunications network for personalization, a possible misdirection of the personalization data is recognized by the subscriber identification module (SIM), the data are discarded and an automatic repetition of the personalization request takes place.

Particularly preferably, if the confirmation of the mobile radio terminal to the mobile telecommunications network does not occur, a new transmission of the personalization data takes place automatically.

Preferably, the storage of the final subscriber data set (S) in the home register (HLR) does not take place until after confirmation from the mobile radio terminal to the mobile telecommunications network.

Preferably, the activation and/or release of the subscriber relationship (subscription) characterized by the final subscriber data set (S) in the home register (HLR) does not take place until after confirmation from the mobile radio terminal to the mobile telecommunications network.

Particularly preferably, the final subscriber data sets (S) have already been created in reserve for a short time in the home register (HLR). This ensures that a personalization of subscriber identification modules (SIM cards) can be carried out at short notice at any time.

Preferably, the subscriber relationships (subscriptions) characterized by the final subscriber data sets (S) in the home register (HLR) have already been created in the home register (HLR) for a short time.

Particularly preferably, the subscriber relationships (subscriptions) characterized by the final subscriber data sets (S) in the home register (HLR) are provided with specific service restrictions.

Preferably, further loading operations to provide the SIM card with special properties and/or services are carried out automatically following the completed personalization.

Preferably, following the completed personalization, a mechanical or personal dialogue is automatically started with the customer, preferably via the mobile radio terminal, to determine the customer data, desired services, etc. and in particular any specific service restrictions are not removed until after this.

BRIEF DESCRIPTION OF THE DRAWING

An illustrated embodiment of the method according to the invention is shown in the FIGS. and is explained below. Therein.

DETAILED DESCRIPTION OF THE INVENTION

Chip cards (SIM) are equipped with a non-individual set of initial identification and authentication parameters $$s^*_I = \{IMSI^*_I, K^*_I, OPc^*_I, Qc^*_I, OK^*_I\} \text{ with } I=0, 1 \ldots, N-1 \text{ and } N \ll M;$$

where $IMSI^*_I$ contains the valid network identifier MCC and MNC of the operator. N designates the entire quantity of the $S^*_I$ and M designates the quantity of those SIM produced in total for a network operator. Within M the $S^*_I$ are thus repeated M/N times and therefore are not unique and not individual.

The usual serial number (ICCID) is added as the only individual feature, which is assigned consecutively by the manufacturer during production. It is important that all of the data to be assigned by the manufacturer in the current production process are assigned completely automatically and without specific (individual) specifications of the network operator.

In the operator's mobile telecommunications network there is a special database (THLR) having the fixed size N with the $S^*_1$ and respectively a fixedly assigned telephone number $MSISDN^*_I$. The subscriber relationships in the database are unchangeable, in particular there is no connection to the chip card manufacturer.

Figure 1:
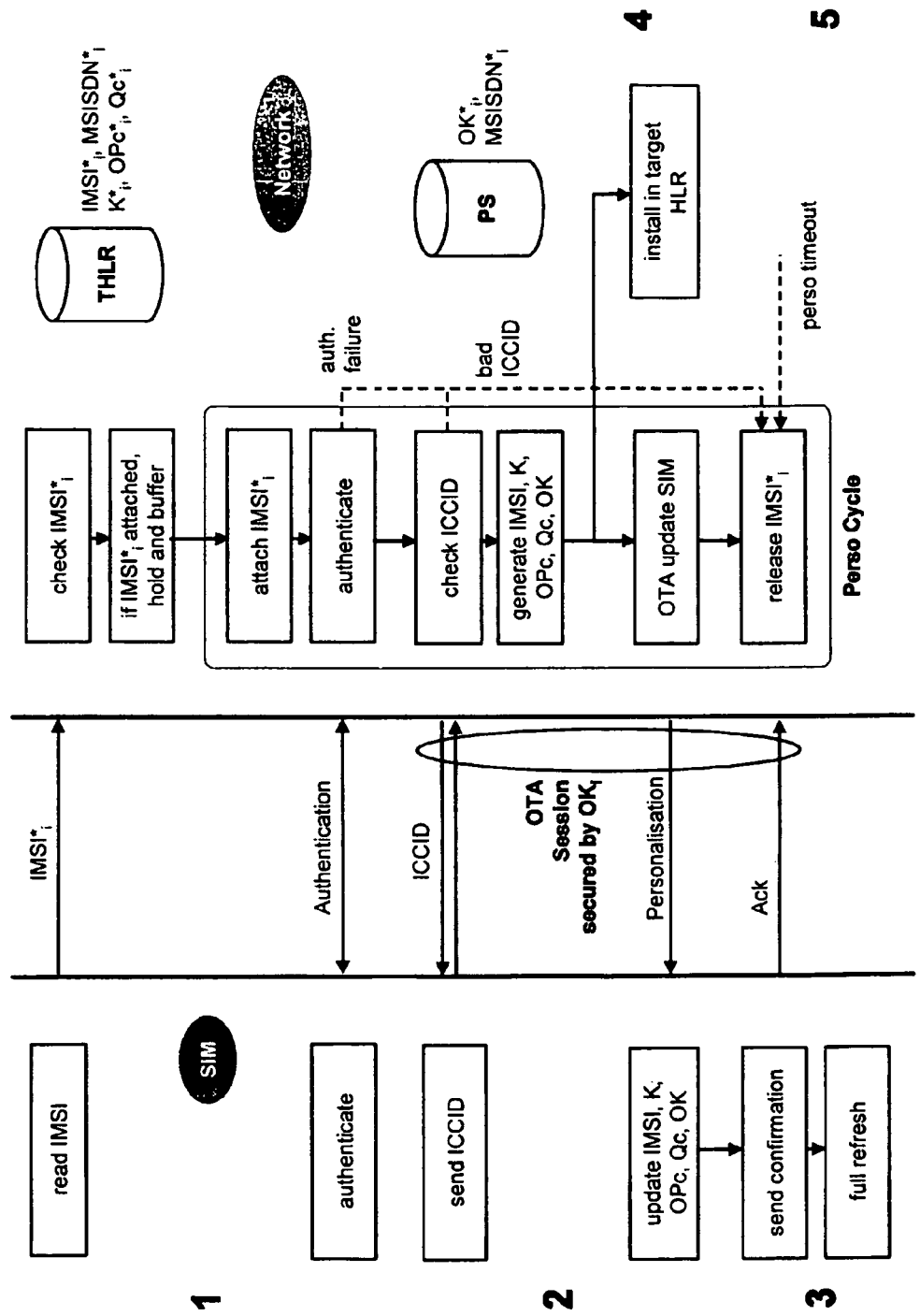
FIG. 1 is a diagram showing the method according to the invention of the OTA personalization of a SIM subscriber identification module.
Figure 2:
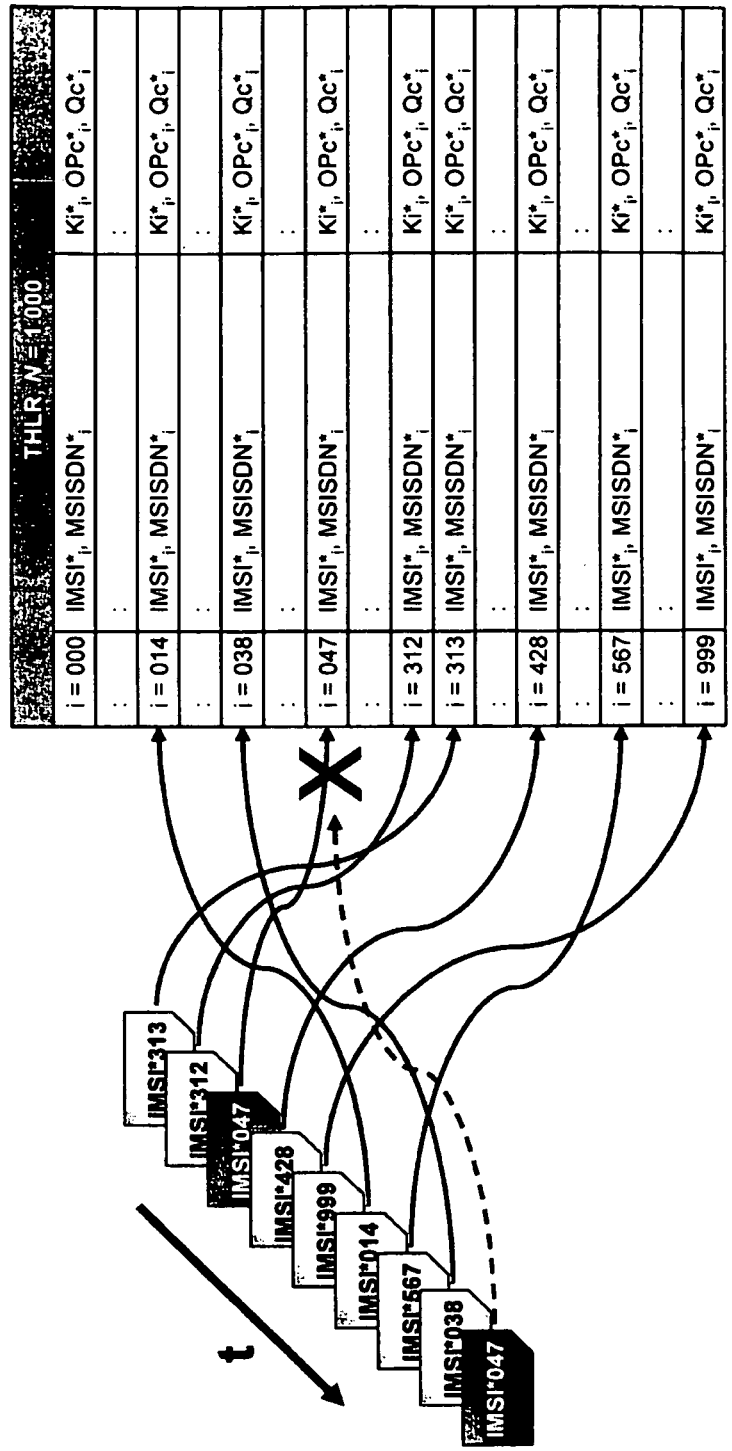
FIG. 2 is a diagram showing simultaneous commissioning of several SIMs, in particular with identical preliminary parameter set.

An associated SIM is now commissioned for the first time in a completely standard mobile terminal device (i.e., not equipped with any special precautions with respect to the present suggestion). Simplifying the other system processes in logging into a mobile telecommunications network, the personalization is carried out according to the representation according to FIG. 1:

1. The $IMSI^*_I$ is read by the mobile terminal device and transmitted in a standard manner to the received mobile telecommunications network, from there optionally transmitted further to the home network and therein to the THLR. The routing information necessary for this purpose is taken from the $IMSI^*_I$. The $IMSI^*_I$ is known in the THLR, and according to the normal protocol the authentication is initiated between the card and the THLR with the data $S^*_1$. The result is positive and the subscriber relationship is transferred in a standard manner to the status in which an establishment of connections is possible on both sides.

As a special function, the THLR provides the $IMSI^*_I$ with the "in use" status at the earliest possible time. This status is retained until the release of the $IMSI^*_I$, either through regular conclusion of the subsequent personalization or the occurrence of a special case (see below).

2. On the network side the OTA personalization is now started, i.e., the transmission of the personalized subscriber data via a radio connection, in that the index I is transferred to the personalization server PS. The PS knows the matching $MSISDN^*_I$ to the index I and the OTA key $OK^*_I$. It now establishes a secure OTA session therewith according to the prior art to the respective SIM.

For example, the ICCID of the card or the IMEI of the device can now firstly be checked (for example, by means of a black or white listing) and/or further security parameters of the card can be requested (for example a certificate) before the actual personalization starts. To this end final subscriber data $$S = \{IMSI, K, OPc, Qc, OK\}$$

are generated in the PS, transmitted via the existing OTA channel to the SIM and stored there—the card is thus individually personalized.

3. The process is suitably supported on the card side and secured such that connection errors or an only partial reception cannot lead to an incomplete (thus invalid) personalization. Only after complete and correct reception and the storage of all of the necessary data does the SIM acknowledge the operation to the PS and subsequently initiates a warm start (full refresh) of the terminal device, now with the final subscriber data S.

4. Parallel to the personalization of the SIM, the PS initiates the establishment of the subscriber relationship S in the final HLR. Thus on both sides a state is reached like that after the conventional personalization and configuration. The SIM can now be used for standard operation.

Preferably, the storage and activation of the final subscriber relationship S in the home register HLR cannot be carried out until after reception of the acknowledgment of the SIM to the mobile telecommunications network and are provisionally provided with specific service restrictions.

To accelerate the process, the final subscriber relationship S can already be stored in the short term in the HLR for example, in that the PS regularly stores and activates a number of subscriber relationships S for prompt use (for example for the next hour or the next day) in the HLR in a forward-looking manner.

(5) The acknowledgment of the SIM obtained in (3) leads in the PS and the THLR to the immediate release of the subscriber relationship $S_i^*$, in particular the $IMSI_i^*$. It changes from the "in use" status to the "free" status and is thus ready for the next use.

In fact due to the non-unique nature of the parameter data sets and the randomness of the commissionings, even with uniform distribution of the $S_i$ in the produced total quantity (which is achieved by simple incrementation of I during production), collisions in the OTA personalization are to be expected. This is the case when, during the processing of the subscriber relationship $S_i^*$, i.e., when the $IMSI_i^*$ is characterized as "in use," a second or even further log in attempts by other SIM with identical parameter data set $S_i^*$ occur. This case is shown in FIG. 3. However, collisions of this type represent a regular operating condition, which is taken into account as follows:

Log in attempts with $IMSI_i^*$ that cannot be processed immediately are arranged in a queue and processed in the order of receipt.

The number N of the parameter sets is to be selected such that the probability of a collision (and definitely of a multiple collision) is sufficiently small. Since N<<M still applies, the advantages of the present suggestion are maintained in full even where N=1,000 or N–10,000.

The speed of the OTA personalization is to be designed by optimized systems such that the period in which an $IMSI_i^*$ is in use is as short as possible.

Error cases during the personalization cycle, such as the absence of the acknowledgment of the SIM, are to be limited by time out such that the $IMSI_i^*$ is released again promptly as far as possible.

A possible blockage of the personalization operation (absence of the personalization data) is recognized by the SIM and leads to the automatic repetition of the personalization request.

A possible misdirection of the personalization data is recognized by the SIM, the data are discarded and an automatic repetition of the personalization request occurs.

In the case of the absence of an acknowledgment of the SIM to the mobile telecommunications network, the personalization data can be sent again automatically.

The personalization process is automatically followed by a warm start and a log in attempt with the final subscriber data. The further configuration of the subscriber relationship on the card side can now be undertaken in a new OTA process without any time pressure.

This relates to the further embodiment of the SIM card with special properties and services and the determination of the customer data and services required by means of a personal or mechanical dialogue, preferably via the mobile radio terminal. If necessary, special service restrictions present beforehand are finally removed.

The use of the suggested concept is not limited to the OTA channel (which, however, is likely to be the most interesting for use in mobile radio telecommunications networks), but is also conceivable in line variants. For example, when the personalization is to be carried out in a decentralized manner, but still at the points of sale (POS) of the network operator or the supplier. This is even conceivable at any location via the Internet and a connected card reader. The principles, such as e.g. the reuse of the $IMSI_i^*$ thereby apply unchanged, as do the advantages to be achieved compared to the prior art.

The following advantageous embodiments are listed briefly below:
All systems for example GSM, UMTS, IMS, WLAN, WIMAX, LTE/SAE/EPS, NGMN, NGN, CDMA
All telecommunications chip cards for example UICC, SIM, USIM, ISIM, RUIM and future cards
All form factors for example ID-1, ID-000, MiniUICC, M2M, IFF and future form factors
All embodiments for example removable, semi-removable, non-removable, soft
All OTA channels for example SMS, BIP/CAT-TP, TCP/IP as well as RDM
All line channels for example LAN, WAN, Internet
All terminal devices for example mobile or land-line telephones, PCs and notebook PCs, data modules
All decentralized card readers for example at POS
All scopes for example from (IMSI, K) to complete Perso/Individualization and software download
With additional security by PKI methods, certificates and/or personalization identifier
With deduction of certain parameters
With evaluation of the IMEI (device-specific personalization)
With evaluation of the ICCID (card-specific personalization)
As service by $3^{rd}$ party
As initial personalization or re-personalization, also with change of network operator
Integrated into on-line dialogue including conclusion of agreement and activation

The invention claimed is:

1. A method of commissioning and personalizing subscriber identification modules, the method comprising the steps of:
providing a plurality of subscriber identification modules;
equipping each of the subscriber identification modules with a preliminary data set containing at least one non-individual, not unique, provisional, and preliminary subscriber identification and a non-individual, not unique, and provisional secret key that together permit a first commissioning of the subscriber identification module in a mobile telecommunications network by means of a mobile radio terminal; and
first commissioning a subscriber module of the plurality of subscriber identification modules by sequentially:
logging onto the telecommunications network and requesting personalization using the preliminary data set,
transmitting from the telecommunications network to the subscriber identification module an individual and final subscriber data set containing a final and unique subscriber identification and a final and unique secret key via a regular connection of the mobile telecommunications network, and
storing on the subscriber identification module the individual and final subscriber data set.

2. The method according to claim 1 wherein the first commissioning further comprises the steps of:
setting up a connection to a personalization server in the mobile telecommunications network,
generating the individual and final subscriber data set for the personalization by the personalization server using the preliminary data set, and
transmitting the individual and final subscriber data set to the subscriber identification module.

3. The method according to claim 1, further comprising before the personalization the step of:
reviewing either the serial number of the one subscriber identification module, or the equipment identity number of the mobile radio terminal or other security parameters of the subscriber identification module.

4. The method according to claim 1, further comprising the step of:
cyclically reusing the preliminary data set during the initial equipment of each of the plurality of subscriber identification modules.

5. The method according to claim 1, further comprising the step of:
storing the individual and final subscriber data set generated during the personalization in a home register after the first commissioning of the subscriber identification module.

6. The method according to claim 5, wherein the activation or release of the subscriber relationship characterized by the individual and final subscriber data set in the home register does not take place until after confirmation from the mobile radio terminal to the mobile telecommunications network.

7. The method according to claim 1, further comprising, after the receipt and storage of the individual and final subscriber data set on the subscriber identification module, the step of:
   transmitting a confirmation from the mobile radio terminal to the mobile telecommunications network, and
   carrying out a warm boot of the mobile radio terminal holding the subscriber identification module using the individual and final subscriber data set.

8. The method according claim 7, further comprising, if the confirmation of the mobile radio terminal to the mobile telecommunications network does not occur, the step of:
   effecting a new transmission of the individual and final subscriber data set.

9. The method according to claim 7, wherein the storage of the individual and final subscriber data set in the home register does not take place until after confirmation from the mobile radio terminal to the mobile telecommunications network.

10. The method according to claim 1, further comprising, during the first commissioning of the subscriber identification module with the preliminary data set, the step of:
   setting a subscriber relationship given by the preliminary subscriber identification by the network to an in use status during which only a restricted use is released, and,
   after completion of the personalization of the subscriber identification module with the individual and final subscriber data set, setting the subscriber relationship given by the preliminary subscriber identification to a released status permitting new use of the subscriber relationship given by the preliminary subscriber identification by another of the plurality of subscriber identification modules.

11. The method according to claim 1, further comprising, during a commissioning attempt of at least one other subscriber identification module with a preliminary subscriber identification identical to the subscriber identification module already logged into the mobile telecommunications network for personalization, the steps of:
   ordering the at least one other subscriber identification module in a queue takes place and processing the at least one other subscriber identification module according to the chronological order of commissioning attempts.

12. The method according to claim 1, further comprising, during a commissioning attempt of at least one other subscriber identification module with a preliminary subscriber identification identical to the subscriber identification module already logged into the mobile telecommunications network for personalization, the steps of:
   recognizing a possible blocking of the personalization by the subscriber identification module, and
   automatically repeating the personalization request.

13. The method according to claim 1, further comprising, during a commissioning attempt of at least one other subscriber identification module with a preliminary subscriber identification identical to the subscriber identification module already logged into the mobile telecommunications network for personalization, the step of:
   recognizing a possible misdirection of the individual and final subscriber data set by the subscriber identification module,
   discarding the individual and final subscriber data set, and
   automatically repeating the personalization request.

14. The method according to claim 1, wherein the individual and final subscriber data sets are already stored in the home register.

15. The method according to claim 1, further comprising before the personalization the step of:
   creating in the home register the subscriber relationships characterized by the individual and final subscriber data sets.

16. The method according to claim 5, further comprising the step of:
   providing the subscriber relationships characterized by the individual and final subscriber data sets in the home register with specific service restrictions.

17. The method according to claim 1, further comprising the step of:
   carrying out further loading operations to provide the subscriber identification module with special properties or services ate automatically following completion of personalization.

18. The method according to claim 1, further comprising, following the completed personalization, the step of:
   automatically starting a mechanical or personal dialogue with the customer via the mobile radio terminal, to determine the customer data or desired services.

* * * * *